(12) United States Patent
Chen

(10) Patent No.: US 12,316,968 B2
(45) Date of Patent: May 27, 2025

(54) PHOTOGRAPHING DEVICE STABILIZER

(71) Applicant: HOHEM TECHNOLOGY CO., LTD., Shenzhen (CN)

(72) Inventor: Min Chen, Shenzhen (CN)

(73) Assignee: HOHEM TECHNOLOGY CO., LTD., Shenzhen (CN)

( * ) Notice: Subject to any disclaimer, the term of this patent is extended or adjusted under 35 U.S.C. 154(b) by 102 days.

(21) Appl. No.: 18/019,666

(22) PCT Filed: Dec. 23, 2020

(86) PCT No.: PCT/CN2020/138634
§ 371 (c)(1),
(2) Date: Feb. 3, 2023

(87) PCT Pub. No.: WO2022/027906
PCT Pub. Date: Feb. 10, 2022

(65) Prior Publication Data
US 2023/0209199 A1 Jun. 29, 2023

(30) Foreign Application Priority Data

Aug. 5, 2020 (CN) .......................... 202010776743.3

(51) Int. Cl.
*H04N 23/68* (2023.01)
*F16M 11/12* (2006.01)
(Continued)

(52) U.S. Cl.
CPC ......... *H04N 23/687* (2023.01); *F16M 11/123* (2013.01); *F16M 11/18* (2013.01);
(Continued)

(58) Field of Classification Search
None
See application file for complete search history.

(56) References Cited

U.S. PATENT DOCUMENTS

| 2010/0218024 A1* | 8/2010 | Yamamoto | G06F 3/0346 715/740 |
| 2012/0026325 A1 | 2/2012 | Bunker et al. | |

(Continued)

FOREIGN PATENT DOCUMENTS

| CN | 202455441 U | 9/2012 |
| CN | 202737998 U | 2/2013 |

(Continued)

OTHER PUBLICATIONS

European Patent Office: Extended Search Report of EP Application No. 20948152.2 (related application); The Hague; Rocca, Delphine; Jul. 5, 2024; 11 pages.

(Continued)

*Primary Examiner* — Quan Pham

(57) ABSTRACT

A photographing device stabilizer includes, a clamping member, an object tracking member, and a control member. The object tracking member is fixedly connected to a photographing device by the clamping member; a distance between the object tracking member and a camera of the photographing device is less than or equal to a preset distance threshold, and is consistent with the orientation of the camera; the object tracking member is used for obtaining detection information of an oriented position, and sending a tracking movement instruction to the control member according to position information by means of the network connection when position information of a target object is obtained according to the detection information; the control member is used for performing position adjustment control according to the position information when the tracking movement instruction is received, so that the camera of the photographing device is oriented towards the target object.

15 Claims, 2 Drawing Sheets

(51) Int. Cl.
  *F16M 11/18*    (2006.01)
  *G03B 17/56*    (2021.01)
  *H04M 1/02*     (2006.01)
  *H04N 23/61*    (2023.01)
  *H04N 23/661*   (2023.01)
  *H04N 23/695*   (2023.01)

(52) U.S. Cl.
  CPC ........ *G03B 17/561* (2013.01); *H04M 1/0264* (2013.01); *H04N 23/61* (2023.01); *H04N 23/661* (2023.01); *H04N 23/695* (2023.01); *H04M 2250/52* (2013.01)

(56) References Cited

U.S. PATENT DOCUMENTS

| | | |
|---|---|---|
| 2012/0188388 A1 | 7/2012 | Kim |
| 2016/0171330 A1 | 6/2016 | Mentese et al. |
| 2019/0108412 A1 | 4/2019 | Wang et al. |
| 2020/0003357 A1* | 1/2020 | Su .................. F16M 11/18 |
| 2020/0186719 A1 | 6/2020 | Lee |
| 2022/0078347 A1* | 3/2022 | Qian .............. H04N 23/6811 |

FOREIGN PATENT DOCUMENTS

| | | |
|---|---|---|
| CN | 105049733 A | 11/2015 |
| CN | 105223859 A | 1/2016 |
| CN | 105306820 A | 2/2016 |
| CN | 105578146 A | 5/2016 |
| CN | 106127142 A | 11/2016 |
| CN | 106598081 A | 4/2017 |
| CN | 106989251 A | 7/2017 |
| CN | 107645599 A | 1/2018 |
| CN | 108200339 A | 6/2018 |
| CN | 105049733 B | 8/2018 |
| CN | 108683854 A | 10/2018 |
| CN | 109131895 A | 1/2019 |
| CN | 109977770 A | 7/2019 |
| CN | 110086992 A | 8/2019 |
| CN | 110149476 A | 8/2019 |
| CN | 110213493 A | 9/2019 |
| CN | 110913137 A | 3/2020 |
| CN | 210469439 U | 5/2020 |
| CN | 111345029 A | 6/2020 |
| CN | 111901527 A | 11/2020 |
| CN | 111901528 A | 11/2020 |
| CN | 109391762 B | 10/2021 |
| JP | S5876268 U | 5/1983 |
| JP | H06167332 A | 6/1994 |
| JP | 2016048863 A | 4/2016 |
| JP | 2019174842 A | 10/2019 |
| WO | 2018121385 A1 | 7/2018 |
| WO | 2018150569 A1 | 8/2018 |

OTHER PUBLICATIONS

China Intellectual Property Office: Office Action of CN 202010776743.3 (priority application); Apr. 22, 2021; 15 pages.
Patent Cooperation Treaty: International Search Report and Written Opinion of PCT/CN2020/138634 (priority application), China National Intellectual Property Administration (ISA); Apr. 22, 2021; 13 pages.
China Intellectual Property Office: Office Action of CN 202010776468.5 (priority application); Apr. 22, 2021; 22 pages.
China Intellectual Property Office: Office Action of CN 202210180742.1 (priority application); Aug. 25, 2023; 22 pages.
Japanese Patent Office: Notice of Reasons for Refusal of JP Patent Application 2023-508078 (related application); Nakajima, Akihiro; Jan. 24, 2024; 14 pages.
Korea Intellectual Property Office: Office Action of KR 10-2023-7007446 (related application); Dec. 9, 2024; 11 pages.

* cited by examiner

PHOTOGRAPHING DEVICE STABILIZER

CROSS-REFERENCE TO RELATED APPLICATIONS

This application is a U.S. National Phase application submitted under 35 U.S.C. § 371 of Patent Cooperation Treaty application serial no. PCT/CN2020/138634, filed Dec. 23, 2020, and entitled PHOTOGRAPHING DEVICE STABILIZER, which application claims priority to Chinese patent application serial no. 202010776743.3, filed Aug. 5, 2020, and entitled PHOTOGRAPHING DEVICE STABILIZER. Patent Cooperation Treaty application serial no. PCT/CN2020/138634, published as WO 2022/027906, and Chinse patent application serial no. 202010776743.3, are incorporated herein by reference.

TECHNICAL FIELD

The present disclosure relates to the technical field of electronic device, in particular to a photographing device stabilizer.

BACKGROUND

With the diversification of lifestyles, many people will choose to take pictures, videos or the like by themselves with photographing devices such as mobile phones or the like. In order to ensure the shooting effect, more and more stabilizers for the photographing devices are generated, such as gimbals, handheld stabilizers, etc. In addition to stabilizing the photographing device, these stabilizers can also cooperate with application programs (APP) to achieve intelligent interactive functions such as target tracking or the like.

The stabilizers currently on the market need to rely on specific APPs provided by the manufacturer to achieve the target tracking. Thus, the users have to install a specific APP to achieve tracking shooting, which makes an operation of the stabilizer complicated.

SUMMARY

Accordingly, it is necessary to provide a photographing device stabilizer for the problem that an operation of the stabilizer is relatively complicated.

A photographing device stabilizer includes a clamping component, an object tracking component, and a control component. The object tracking component is fixedly connected to the photographing device through the clamping component. A distance between the object tracking component and a camera of the photographing device is less than or equal to a preset distance threshold, and the object tracking component is oriented in the same direction as the camera. A network connection is established between the control component and the object tracking component. The object tracking component is configured to acquire a detection information of an oriented position thereof, and when a position information of the target object is acquired according to the detection information, to send a tracking movement instruction to the control component through the network connection according to the position information. The control component is configured to perform position adjustment control according to the position information when receiving the tracking movement instruction, so that the camera of the photographing device is oriented towards the target object.

In the above technical solution, the distance between the object tracking component and the camera is small enough and the object tracking component is oriented in the same direction as the camera. Accordingly, the object tracking component can adjust the orientation of the camera by interacting with the control component to achieve target tracking. That is, the target tracking can be achieve through the photographing device stabilizer without a cooperation with a specific APP, which can effectively improve the efficiency of target tracking.

DETAILED DESCRIPTION

Figure 1:
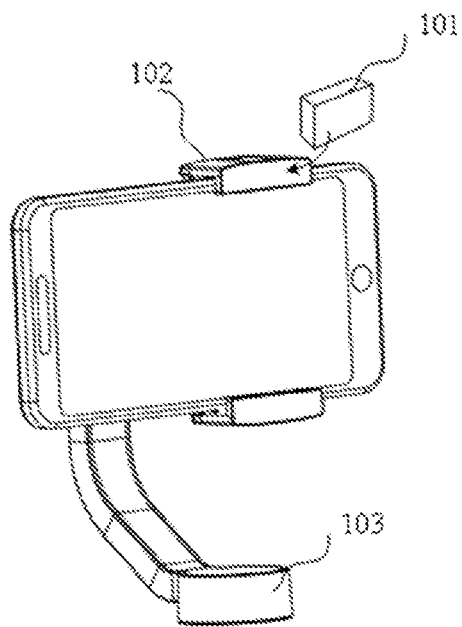
FIG. 1 is a perspective view of a photographing device stabilizer according to an embodiment.

In order to make the above-mentioned purpose, features and advantages of the present disclosure more obvious and understandable, the specific implementation manners of the present disclosure will be described in detail below in conjunction with the accompanying drawings. In the following description, numerous specific details are set forth in order to provide a thorough understanding of the present disclosure. However, the present disclosure can be implemented in many other ways different from those described herein, and those skilled in the art can make similar improvements without departing from the connotation of the present disclosure, so the present disclosure is not limited by the specific embodiments disclosed below.

In the description of the present disclosure, it should be understood that the orientations or positional relationships indicated by the terms "center", "longitudinal", "transverse", "length", "width", "thickness", "upper", "lower", "front", "back", "left", "right", "vertical", "horizontal", "top", "bottom", "inner", "outer", "clockwise", "counter-clockwise", "axial", "radial", "circumferential" and the like are based on the orientations or positional relationships shown in the drawings, and they are only for the convenience of describing the present disclosure and simplifying the description, rather than indicating or implying that the referred device or elements have to have specific orientations, or be constructed and operated in specific orientations, and thus should not be construed as limiting the present disclosure.

In addition, the terms "first" and "second" are used for descriptive purposes only, and cannot be interpreted as indicating or implying relative importance or implicitly specifying the quantity of indicated technical features. Thus, the features defined as "first" and "second" may explicitly or implicitly include at least one of these features. In the description of the present disclosure, "plurality" means at least two, such as two, three, etc., unless otherwise specifically defined.

In the present disclosure, unless otherwise clearly specified and limited, the terms such as "installation", "connected", "connection", "fixed" or the like should be interpreted in a broad sense. For example, they may be a fixed connection, a detachable connection, or an integrated connection. They may be mechanically connected or electrically connected. They may be directly connected or indirectly connected through an intermediary. They may be the internal communication of two components or the interaction relationship between two components. Those of ordinary skill in the art can understand the specific meanings of the above terms in the present disclosure according to specific situations.

In the present disclosure, unless otherwise clearly specified and limited, a first feature being "on" or "under" a second feature may mean that the first and second features are in direct contact, or that the first and second features are in indirect contact through an intermediary. Moreover, the first feature being "above" the second feature may mean that the first feature is directly above or obliquely above the second feature, or simply means that the first feature is horizontally higher than the second feature. The first feature being "below" the second feature may mean that the first feature is directly below or obliquely below the second feature, or simply means that the first feature is horizontally lower than the second feature.

It should be noted that when an element is referred to as being "fixed on" or "provided on" another element, it may be directly on the another element or there may be an intervening element. When an element is referred to as being "connected to" another element, it may be directly connected to the another element or intervening elements may also be present. As used herein, the terms "vertical", "horizontal", "upper", "lower", "left", "right" and similar expressions are for the purpose of illustration only and are not intended to represent the only embodiment.

An embodiment of the present disclosure provides a photographing device stabilizer including a clamping component, an object tracking component, and a control component. The object tracking component is fixedly connected to the photographing device through the clamping component. A distance between the object tracking component and a camera of the photographing device is less than or equal to a preset distance threshold, and the object tracking component is oriented in the same direction as the camera. A network connection is established between the control component and the object tracking component. The object tracking component is configured to acquire a detection information of an oriented position thereof, and when a position information of the target object is acquired according to the detection information, to send a tracking movement instruction to the control component through the network connection according to the position information. The control component is configured to perform position adjustment control according to the position information when receiving the tracking movement instruction, so that the camera of the photographing device is oriented towards the target object.

Referring to FIG. 1, FIG. 1 shows a perspective view of a photographing device stabilizer according to an embodiment of the present disclosure. The photographing device stabilizer includes an object tracking component 101, a clamping component 102, and a control component 103. The object tracking component 101 is fixedly connected to a photographing device through the clamping component 102. It should be noted that the arrow in FIG. 1 indicates that the object tracking component 101 is fixed on the clamping component 102, and thus fixedly connected to the photographing device. In an actual application environment, other fixed connection methods may be used.

A network connection is established between the object tracking component 101 and the control component 103, and the two components communicate through the network connection to achieve position adjustment, so that a camera of the photographing device is oriented towards the target object to achieve the purpose of target tracking.

The photographing device may be various electronic devices provided with a camera and capable of photographing, which may be a camera, a smart phone, a tablet computer, etc. The stabilizer may be various devices that stabilize the position of a clamped equipment, such as a handheld stabilizer, a gimbal stabilizer, etc.

The object tracking component refers to a component that can track objects ahead, which can be a component that achieves object tracking based on visual detection technology, radar detection technology, infrared detection technology, etc. Taking the visual detection technology as an example, the object tracking component may be called a visual tracking component or a visual tracking module. Further, the object tracking component may be a photographing device, a radar detector, an infrared detector, etc. Based on the technology used, the object tracking component can detect different objects in a targeted manner. Taking the visual tracking component as an example, the detected objects can be various objects that can be detected by the visual detection technology, such as human beings, buildings, animals, etc. Further, the object tracking component may be a component fixedly provided on the photographing device stabilizer, or may be an independent component independent of other components of the photographing device stabilizer. In an embodiment, in order to ensure a portability of the photographing device stabilizer, the object tracking component is implemented using a small size device, e.g., a miniature camera, a small infrared detector, etc.

The clamping component refers to a component that can fix an object to another object through a clamping mechanism. When the object tracking component is fixedly connected to the photographing device through the clamping component, the object tracking component, the clamping component and the photographing device are in a relatively stationary state. Among them, the fixed connection means that the object tracking component, the clamping component, and the photographing device may be connected in one. Alternatively, the fixed connection may mean that the clamping component is respectively connected to the object tracking component or the photographing device in one. Assuming that the clamping component is connected to the object tracking component in one, as an object tracking device as a whole, the object tracking device can be mounted on the photographing device by clamping. Alternatively, the fixed connection may mean that the clamping component is actively connected to both the object tracking component and the photographing device, and the clamping component is respectively connected to the object tracking component and the photographing device by specific means, e.g., threaded connection, snap-on connection, etc.

It should be noted that the clamping component can fix the photographing device. The object tracking component does not need to communicate with a specific APP on the photographing device to achieve position adjustment. Therefore, in some embodiments, the position tracking of the target object can also be achieved in the case that the photographing device is not mounted on the photographing device stabilizer. At this time, the object tracking component acquires a position information of the target object, and the control component adjusts a position of the object tracking component according to the position information, so that the object tracking component keeps being oriented towards the target object.

The control component refers to a component having logic control functions and position movement functions. Further, the control component may include a processor and a connecting shaft. The processor can implement logic operations and output control instructions according to the results of the logic operations. The connecting shaft can rotate according to the control instructions output by the processor, and thus drive the photographing device, the clamping component, etc., to adjust the positions thereof. In some embodiments, the network communication between the control component and the photographing device may be carried out through blue tooth, wired communication, etc.

A distance between the object tracking component and the camera of the photographing device is less than or equal to a predetermined distance threshold (i.e., a preset distance threshold). This preset distance threshold can be adjusted according to an actual situation. It can be a length of a specific object, such as a length of the photographing device. It can be a length of the clamped photographing device, or an average length of a specific type of photographing device (e.g., mobile phone, SLR camera, etc.). It can also be a specific length value, such as 10 cm, 5 cm, 1 cm, etc. The distance between the object tracking component and the camera of the photographing device may refer to a distance between a center or an edge of the object tracking component and a center or an edge of a camera lens which may specifically refer to a lens. Further, the distance between the object tracking component and the camera of the photographing device is less than or equal to the preset distance threshold, so that the distance between the object tracking component and the camera is small enough. That the distance is small enough herein means that as long as the object tracking component does not hinder a normal shooting of the camera, the object tracking component can be as close as possible to the camera. Specifically, the distance between the object tracking component and the camera of the photographing device refers to a distance between an edge of the object tracking component and an edge of the camera, and the preset distance threshold is 0. That is, the object tracking component is provided at the edge of the camera in a position that just does not block a field of view of the camera and ensures that the camera can shoot properly.

Further, when the distance between the object to be photographed and the photographing device is relatively long, such as when the distance between the object to be photographed and the photographing device is greater than 10 meters, in which it should be noted that this distance can be adjusted according to the actual situation, the distance between the object tracking component and the camera can be a slightly larger value, for example, 10 cm. While when the distance between the object to be photographed and the photographing device is relatively short, such as in a selfie state, where the distance between the object to be photographed and the photographing device is less than 0.5 meters (it should be noted that this distance can be adjusted according to the actual situation), the distance between the object tracking component and the camera can be a slightly smaller value, for example, 1 cm. Therefore, the distance between the object tracking component and the camera can be adjusted according to the distance between the photographing device and the object to be photographed. Further, the preset distance threshold is determined by multiplying the distance between the photographing device and the object to be photographed by a set factor, e.g., 0.1.

That the object tracking component is oriented in the same direction as the camera may refer to that an orientation of a probe of the object tracking component is consistent with the orientation of the camera. Further, the consistent orientation may mean that a coincidence degree between a field of view of the probe of the object tracking component and a field of view of the camera is higher than a set threshold, and this threshold can be determined according to the actual condition, for example, 80%, 90%, etc.

In an embodiment, that the object tracking component is oriented in the same direction as the camera may mean that when the photographing device is in a shooting state, an object tracking module is oriented in the same direction as the camera of the photographing device, but when the photographing device in a non-shooting state, the orientations of the two may be different. Further, it may also be that the camera of the photographing device in the shooting state is in the same direction as the object tracking component in an object tracking state. Wherein, being in the object tracking state may mean that the object tracking component is in an activated state, or that the object tracking component is in a state of acquiring a detection information ahead, or that the object tracking component is in a state of acquiring the position information of the target object.

At least one camera can be provided on the photographing device, and the directions of these cameras can be same or different. Taking a mobile phone as an example, if two or more cameras are provided, these cameras may all be rear cameras, or may all be front cameras, or may have both a front camera and a rear camera. Further, in some embodiments, the object tracking component can be disposed according to the direction of the camera of the photographing device. For example, on a mobile phone provided with a front camera and a rear camera, a front object tracking component (the probe faces the front of the phone where the screen is located, that is, in the same direction as the front camera) and a rear object tracking component (the probe faces the rear of the phone, that is, in the same direction as the rear camera) can be provided, respectively. Alternatively, only the rear object tracking component can be provided. In this case, the object tracking component can start an object tracking process when the rear camera of the mobile phone is in the shooting state, while it does not start the object tracking process when the front camera is in the shooting state. Alternatively, only the front object tracking component can be provided.

In some embodiments, the object tracking module may be connected to a direction adjustment mechanism. The control component can control the orientation of the probe of the object tracking module through the direction adjustment mechanism. Further, the direction of the object tracking component can be adjusted according to the direction and the starting state of the camera, so that the object tracking component is oriented in the same direction as the camera. The following is an example to illustrate a direction adjustment of the object tracking component. Taking the mobile phone provided with the front camera and the rear camera as an example, it is assumed that the front object tracking component and the rear object tracking component are provided. In an initial state, the front object tracking component and the rear object tracking component are both in a closed state. When the control component receives a start-up information of the rear camera sent by the mobile phone, the control component sends a start instruction to the rear object tracking component. At this time, the rear object tracking component is started, and the rear camera in the shooting state and the rear object tracking component in the object tracking state both face the rear of the mobile phone and both face the same direction. Taking the mobile phone provided with the front camera and the rear camera as an example, it is assumed that only one object tracking component is provided and the object tracking component faces the front of the mobile phone in an initial state. When the control component receives the start-up information of the rear camera sent by the mobile phone, the probe of the object tracking component is enabled to face the rear of the mobile phone by controlling the direction adjustment mechanism. For example, the probe of the object tracking component is enabled to face the rear of the mobile phone by means of direction rotation. At the same time, the control component controls the object tracking component to start. At this time, the rear camera in the shooting state and the object tracking component in the tracking state are both facing the rear of the mobile phone, and both are facing the same direction.

The relationship of distance and orientation between the probe of the object tracking component and the camera enables the fields of view of the object tracking component and the camera to be close enough. In this case it can be approximated that the object that can be photographed by the camera can also be detected by the object tracking component. Therefore, in the case that the photographing device stabilizer cannot communicate with the photographing device, that is, the photographing device is not installed with a specific APP capable of communicating with the stabilizer, a position adjustment control can be performed according to the detection information of the object tracking component, so as to achieve the purpose of adjusting the position of the photographing device.

Further, during the process of object tracking, the object tracking component acquires the detection information of an oriented position thereof. Wherein, the detection information of the oriented position thereof may refer to all the detection information of the position where the probe of the object tracking component is oriented to. Further, taking the visual tracking component as an example, the visual tracking component may acquire pictures or videos of the oriented position, and use the acquired pictures or videos as the detection information.

When the presence of feature identification information of the target object is determined according to the detection information, the object tracking component acquires position information of the target object. Wherein, the target object is an object targeted by the current tracking control method. Further, the target object may be a certain type of object, such as a human being, a building, an animal, etc. The target object may also be a specific object, such as a specific person, a specific building, a specific animal, etc.

The feature identification information may be a feature of a target object in a certain state. Further, it may be a feature that the target object is in a specific posture or in a specific action. Postures may be poses (e.g., standing position, squatting position, prone position, etc.) and gestures (e.g., "OK" gesture, "V" gesture, "stop" gesture, etc.). Actions can refer to various types of body movements (e.g., nodding, shaking the head, akimbo, specific gestures, etc.), facial movements (e.g., laughing, winking, etc.), etc. In some embodiments, the feature identification information may also refer to voice identification information, for example, timbre, volume, sound frequency range, etc. In addition, the feature may refer to a state feature of the target object in the state which the target object is in. The feature may be an amplitude of the posture, a frequency of the action, etc.

Further, after acquiring the detection information, the object tracking component performs feature analysis on the detection information to acquire detection features, and determines whether the feature identification information of the target object is present according to the detection features. When the feature identification information is present, it is determined that a target tracking trigger information is received, so the position information of the target object is acquired.

Furthermore, the object tracking component sends a tracking movement instruction to the control component according to the position information, so as to trigger the control component to perform position adjustment control according to the position information, so that the camera of the photographing device is oriented towards the target object.

Wherein, the position adjustment may refer to performing position movement, angle adjustment, etc. The position of the object tracking component may be adjusted and the position of the photographing device may also be adjusted.

Further, the control component starts a tracking control program after receiving the tracking movement instruction. Specifically, the control component determines the corresponding target position and target angle when the target object is in the middle of the field of view of the object tracking component according to the position information, and adjusts the position and/or angle of the target tracking component and the photographing device according to the target position and target angle, so that the object tracking component and the photographing device are oriented towards the target object. Furthermore, since the clamping component, the object tracking component and the photographing device are in a relatively fixed state in position, the positions of the object tracking component and the photographing device can be adjusted by adjusting the clamping component.

In some embodiments, in the case that it is determined according to the detection information that the target object is in a static state, which indicates that the position of the target object has not changed, the tracking movement instruction may not be sent to the control component temporarily. Further, the tracking movement instruction is sent to the control component only when it is determined according to the detection information that the position of the target object changes. Such a processing method can not only achieve the tracking of the target object, but also reduce the frequency of interactions between the object tracking component and the control component, thereby reducing the load thereof and ensuring that the object tracking component and the control component have more time to deal with other operations.

In the above photographing device stabilizer, the distance between the object tracking component and the camera is small enough and both are oriented in the same direction. Accordingly, the object tracking component can adjust the orientation of the camera by interacting with the control component to achieve target tracking. That is, the target tracking can be achieved by the photographing device stabilizer without the cooperation with a specific APP. When the object tracking component is directly fixed on the clamping component, the purpose of photographing device stabilizer for target tracking can be achieved even without the photographing device, which can effectively improve the efficiency of target tracking.

It should be noted that the photographing device is independent of the photographing device stabilizer. The photographing device can start shooting pictures or videos at any time.

In an embodiment, the clamping component includes a first clamping portion fixed to the control component. The first clamping portion is configured to clamp the photographing device. The object tracking component is provided on the first clamping portion to be fixedly connected to the photographing device.

Figure 2:
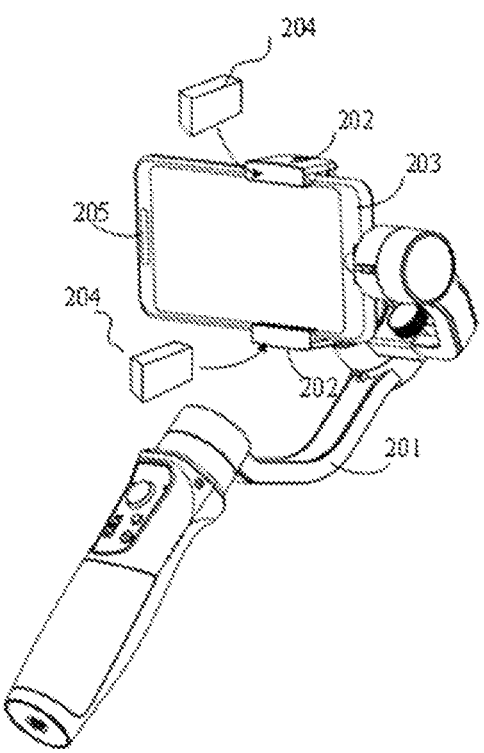
FIG. 2 is a perspective view of a fixed connection between an object tracking component and a photographing device according to an embodiment.

As shown in FIG. 2, the photographing device is a mobile phone, and the mobile phone stabilizer 201 clamps the mobile phone 203 through the first clamping portion 202. FIG. 2 shows two first clamping portions 202, which cooperate to clamp the mobile phone. In an actual application scenario, the number of first clamping portions can be more or less. At this time, the object tracking component 204 can be fixed on the first clamping portion 202, thus achieving a fixed connection between the object tracking component, the first clamping portion and the mobile phone. At this time, the object tracking component 204 and the camera 205 of the mobile phone are facing the same direction and the distance between them is small. It should be noted that the object tracking component can be provided at any position of the first clamping portion. In addition, when two or more first clamping portions are provided, the object tracking component may be provided on all the first clamping portions, or may be selectively provided on some of the first clamping portions.

The conventional photographing device stabilizer is provided with the first clamping portion. In this embodiment, the object tracking component is directly provided on the first clamping portion, and the target object can be easily tracked without changing the structure of the original stabilizer, which can effectively reduce the implementation cost of object tracking.

In an embodiment, the clamping component includes a second clamping portion provided on the object tracking component. The object tracking component clamps the photographing device through the second clamping portion, so as to be fixedly connected to the photographing device.

Figure 3:
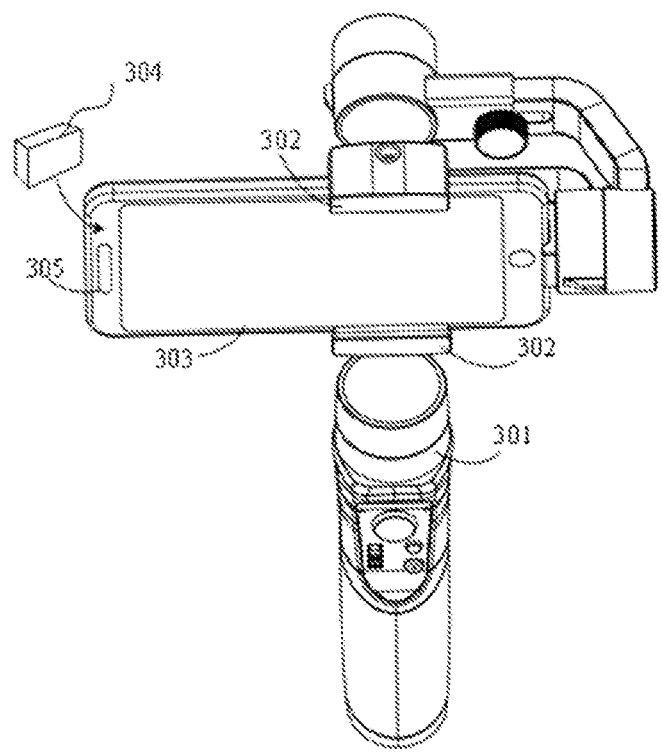
FIG. 3 is a perspective view of the fixed connection between the object tracking component and the photographing device according to another embodiment.

In this clamping mode, the object tracking component can be an external accessory on the photographing device stabilizer, which can be disassembled and installed arbitrarily, and can be clamped on the photographing device or any position of the photographing device stabilizer. As shown in FIG. 3, the photographing device is a mobile phone, and the mobile phone stabilizer 301 clamps the mobile phone 303 through the clamping component 302. At this time, the object tracking component 304 is clamped on the mobile phone 303 at a position close to the camera 305 through the second clamping portion (not shown in FIG. 3), which achieves a fixed connection between the object tracking component, the second clamping portion and the mobile phone. At this time, the object tracking component 304 and the camera 305 of the mobile phone face the same direction and the distance between them is small enough.

In this embodiment, the object tracking component is provided with the second clamping portion. This arrangement enables the object tracking component to be clamped at any position that can be clamped, which is highly convenient. In this way, the object tracking component can be clamped at a position as close as possible to the camera of the photographing device, so that the fields of view of the object tracking component and the photographing device are close enough, so that the photographing device can accurately capture the target object after the position adjustment, thereby ensuring the accuracy of object tracking.

In an embodiment, the control component can perform position correction when a position correction instruction is triggered. After the position correction is completed, the object tracking component starts to acquire detection information, and then starts to track the object.

In an embodiment, the object tracking component includes a first object tracking unit and a second object tracking unit. The first object tracking unit is provided on the first clamping portion. The second object tracking unit clamps the photographing device through the second clamping portion. The control component is further configured to acquire detection information of the first object tracking unit and the second object tracking unit when receiving the position correction instruction, and perform position correction control according to the detection information of the first object tracking unit and the second object tracking unit.

Further, a first position of a feature point in the field of view can be determined according to the detection information of the first object tracking unit, a second position of the feature point can be determined according to the detection information of the second object tracking unit, and the first position and the second position can be combined to determine the position of the feature point, and then determine whether the orientation of the photographing device meets the requirements (e.g., orientation angle, etc.). If the requirement is not met, the control component performs position correction control to adjust the orientations of the first object tracking unit, the second object tracking unit and the photographing device. Further, when there is only one object tracking unit, the above method can also be used to perform the position correction control.

Specifically, the target object who needs to take a selfie with tracking and needs to show a small face is taken as an example. A first position of a nose in the field of view can be determined according to the detection information of the first object tracking unit, a second position of the nose can be determined according to the detection information of the second object tracking unit, and the position of the nose can be determined by combining the first position and the second position, and then whether the orientation angle of the photographing device meets the requirement of showing a small face is determined. If the requirement is not met, the control component performs position correction control to adjust the orientations of the first object tracking unit, the second object tracking unit and the photographing device, so that the selfie photos taken by the photographing device are all photos showing small faces.

In the above-mentioned embodiment, the two object tracking units are respectively provided at different positions, and the position correction control is performed according to the detection information of the two object tracking units when the position correction instruction is received. The correction process is simple and reliable, and targeted correction can be performed according to the needs of the user to meet the requirements of user diversity.

Wherein, the position correction may refer to that the positions of the object tracking component and the photographing device are adjusted under the control of the control component, so that the object tracking component and the photographing device are oriented forward or towards a specific position, and may even be oriented towards the target object.

Further, the object tracking component may also perform the following steps: acquiring a detection information of an oriented position thereof, to acquire the detection information; determining a shaking frequency of the photographing device stabilizer according to the detection information; and sending a position correction instruction to the control component when the shaking frequency is greater than a preset frequency threshold, so that the control component performs position correction control.

Wherein, the preset frequency threshold can be determined according to actual conditions, for example, 20 times per second. Further, when it is determined that the shaking frequency is greater than the preset frequency threshold, the object tracking component can continue to acquire the shaking frequency, and when the shaking frequency is consistently greater than the preset frequency threshold within a preset time range (e.g., 5 seconds), the object tracking component sends the position correction instruction to the control component.

In this embodiment, the object tracking component acquires the detection information, determines a certain feature point in the detection information, determines the shaking frequency of the photographing device stabilizer according to a position change information of the feature point in the field of view, and determines that a position correction trigger information is received when the shaking frequency is too high. At this time, the object tracking component triggers the control component to perform position correction. Thus, the position correction can be triggered according to the interaction information with the user, and the accuracy of object tracking is improved while ensuring the convenience of use.

In an embodiment, the object tracking component can also perform the following steps: acquiring a detection information of an oriented position thereof, to acquire the detection information; determining a shaking angle of the photographing device stabilizer according to the detection information; and sending a position correction instruction to the control component when the shaking angle is greater than a preset angle threshold, so that the control component performs position correction control.

Wherein, the preset angle threshold may be determined according to actual conditions, for example, 20 degrees. Further, when it is determined that the shaking angle is greater than the preset angle threshold, the object tracking component can continue to acquire the shaking angle; and when the shaking angle is consistently greater than the preset angle threshold within a preset time range (e.g., 5 seconds), the object tracking component sends the position correction instruction to the control component.

In this embodiment, the object tracking component acquires the detection information, determines a certain feature point in the detection information, determines the shaking angle of the photographing device stabilizer according to a position change information of the feature point in the field of view, and determines that a position correction trigger information is received when the shaking angle is too high. At the time, the object tracking component triggers the control component to perform position correction. Thus, the position correction can be triggered according to the interaction information with the user, and the accuracy of object tracking is improved while ensuring the convenience of use.

In an embodiment, the control component includes the connecting shaft, and the connecting shaft includes but not limited to two shafts and three shafts. An end of the connecting shaft is fixedly connected to the first clamping portion.

One end of the connecting shaft is fixedly connected to the first clamping portion, and the other end of the connecting shaft can be connected to a motor. In this way, the connecting shaft can be driven to rotate when the motor rotates, and then the first clamping portion can be driven to rotate, so as to achieve the purpose of driving the photographing device to adjust the position thereof.

Further, the connecting shaft includes but is not limited to two shafts and three shafts, which can achieve multi-degree-of-freedom rotation, and thus the photographing device is driven to perform the position movement, the angle adjustment, etc., so as to be more accurately oriented towards the target object and achieve the purpose of precise tracking.

Furthermore, in an embodiment, the photographing device stabilizer further includes a motor, and the motor is connected to the first clamping portion through the connecting shaft. The control component further includes the processor. The processor is configured to send a rotation instruction to the motor when receiving the tracking movement instruction sent by the object tracking component through a wired network or a wireless network. The motor is configured to rotate according to the rotation instruction, and drive the first clamping portion to perform position adjustment through the connecting shaft, so as to adjust the orientation of the camera of the photographing device.

In the above embodiment, the purpose of adjusting the position of the first clamping portion can be achieved through the cooperation of the object tracking component, the motor, the connecting shaft and the control component, so that the position of the photographing device can be adjusted accurately and timely, and the purpose of precise tracking can be achieved.

In an embodiment, the clamping component further includes a motor provided with a third clamping portion. One end of the motor clamps the photographing device through the third clamping portion, and the other end of the motor is fixedly connected to the control component. The object tracking component is provided on the motor to be fixedly connected to the photographing device.

Figure 4:
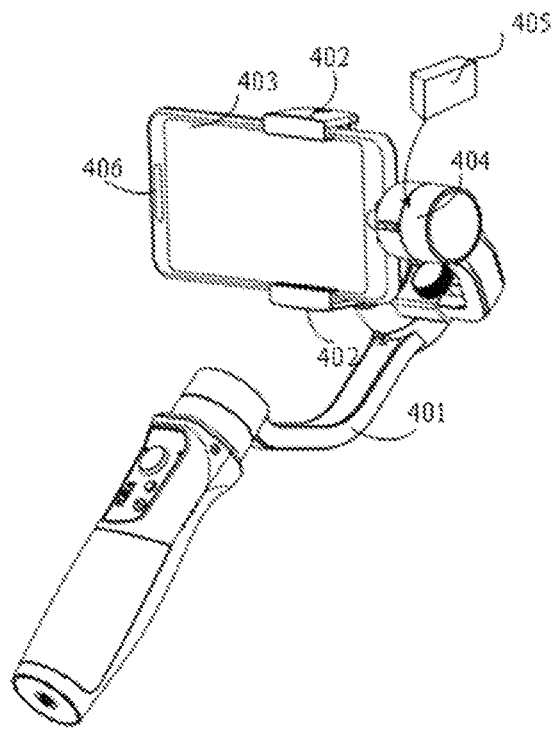
FIG. 4 is a perspective view of the fixed connection between the object tracking component and the photographing device according to another embodiment.

As shown in FIG. 4, the photographing device is a mobile phone, and the mobile phone stabilizer 401 clamps the mobile phone 403 through the clamping component 402. The mobile phone stabilizer 401 is provided with a motor 404. One end of the motor 404 clamps the mobile phone through the third clamping portion, the other end of the motor 404 is connected to the connecting shaft on the mobile phone stabilizer, and the object tracking component 405 is fixed on the motor 404. Thus, a fixed connection between the object tracking component, the third clamping portion, the motor and the mobile phone is achieved. At this time, the object tracking component 405 and the camera 406 of the mobile phone face the same direction and the distance between them is small.

Generally, a motor is provided on the conventional photographing device stabilizer. In the above-mentioned embodiment, the object tracking component is provided on the motor, which can easily achieve the tracking of the target object without changing the structure of the original stabilizer, and can effectively reduce the implementation cost of object tracking.

In an embodiment, the photographing device stabilizer is a handheld stabilizer. The photographing device stabilizer includes a hand-held component, and the hand-held component can be respectively fixedly connected to the first clamping portion, the motor, etc.

Handheld stabilizers generally have a relatively small size. This embodiment does not require to make too much structural improvement on the handheld stabilizer. The object tracking component is fixedly provided on the handheld stabilizer, and the tracking of the target object can be achieved without installing a specific APP on the photographing device. The resulting handheld stabilizer still has a relatively small size and can be carried around, which is very convenient.

In an embodiment, the object tracking component is configured to acquire the position information of the target object when a first posture feature is acquired according to the detection information, and send the tracking movement instruction to the control component through the network connection according to the position information.

The first posture feature may be a feature under a specific pose or gesture. For postures, it may be the features of standing posture, squatting posture, prone, in aspects of the amplitude or angle of posture, etc. For gestures, it may be features such as "OK" gesture, "V" gesture, "stop" gesture or the like in aspects of shapes of gesture and angles of finger.

When the first posture feature is present in the detection information, it can be determined that the target object has made a posture that meets the requirements. At this time, it is considered that the target tracking trigger information of the target object has been received, so that a program for acquiring the position information of the target object is triggered to be executed.

The above-mentioned embodiment starts the object tracking process according to specific posture features, and can interact with the user, instead of starting the tracking of the target object as soon as being started, which improves a privacy protection for the user during the object tracking process, and saves a power of the photographing device stabilizer.

Further, in an embodiment, the first posture feature is a gesture feature. When the object tracking component acquires the detection information, it can locate a position of the hand from the detection information, and perform gesture recognition on the detection information of the position of the hand. When the "OK" gesture is recognized, the object tracking process can be started. That is, the position information of the target object is initially acquired and the target object is tracked according to the position information.

After the tracking process has been performed for a period of time, the target object may want to end the tracking process. At this time, a specific posture may be used to trigger the end of the tracking process. In an embodiment, the object tracking component is configured to stop acquiring the detection information of the oriented position when a second posture feature is acquired according to the detection information.

Wherein, the second posture feature is in the same form as the first posture feature, and both may be features under a specific pose or gesture. Further, the first posture feature and the second posture feature may be same or different. For example, for the same situation, the first posture feature and the second posture feature can be both an "OK" gesture, for different situations, the first posture feature may be an "OK" gesture, and the second posture feature may be a "stop" gesture.

Stopping acquisition of detection information can be considered as ending the object tracking process. At this time, the control component does not acquire new position information, and the position adjustment control can be stopped. Further, after the acquisition of detection information is stopped, the object tracking component may also send a position adjustment stop instruction to the control component, so as to trigger the control component to stop performing position adjustment control.

The above embodiments end the object tracking process according to specific posture features, and can interact with the user, thereby improving the privacy protection for the user during the object tracking process.

The technical features of the above embodiments can be combined arbitrarily. For the sake of brevity, all possible combinations of each technical feature in the above embodiments are not described. However, the combinations of these technical features should be considered as the scope of this description as long as they are not contradicted.

The foregoing embodiments with particular and detailed descriptions are merely several embodiments of the present disclosure, but are not intended to limit the protection scope of the present disclosure. It should be pointed out that several variations or improvements can be figured out by a person skilled in the art within the technical scope disclosed in the present disclosure and they shall all fall within the protection scope of the present disclosure. Therefore, the protection scope of the present disclosure shall be subject to the protection scope of the appended claims.

What is claimed is:

1. A photographing device stabilizer, comprising: a clamping component, an object tracking component, and a control component;
   wherein the object tracking component is fixedly connected to a photographing device through the clamping component, a distance between the object tracking component and a camera of the photographing device is less than or equal to a preset distance threshold, and the object tracking component is oriented in the same direction as the camera;
   a network connection is established between the control component and the object tracking component;
   wherein the object tracking component is configured to acquire a detection information of an oriented position thereof, and when a position information of a target object is acquired according to the detection information, to send a tracking movement instruction to the control component through the network connection according to the position information;
   and wherein the control component is configured to perform position adjustment control according to the position information when receiving the tracking movement instruction, so that the camera of the photographing device is oriented towards the target object;
   wherein the clamping component comprises a first clamping portion fixedly connected to the control component, the first clamping portion is configured to clamp the photographing device, and the clamping component further comprises a second clamping portion provided on the object tracking component;
   and wherein the object tracking component comprises a first object tracking unit and a second object tracking unit, the first object tracking unit is provided on the first clamping portion, and the second object tracking unit clamps the photographing device through the second clamping portion;
   the control component is further configured to acquire detection information of the first object tracking unit and the second object tracking unit when receiving a position correction instruction, and perform position correction control according to the detection information of the first object tracking unit and the second object tracking unit.

2. The photographing device stabilizer according to claim 1, wherein the preset distance threshold is determined according to a distance between the photographing device and the target object.

3. The photographing device stabilizer according to claim 1, wherein the object tracking component is oriented in the same direction as the camera, which indicates that a coincidence degree between a field of view of a probe of the object tracking component and a field of view of the camera is higher than a preset threshold.

4. The photographing device stabilizer according to claim 1, wherein the control component comprises a connecting shaft, the connecting shaft comprises but two shafts or three shafts, and an end of the connecting shaft is fixedly connected to the first clamping portion.

5. The photographing device stabilizer according to claim 4, wherein the photographing device stabilizer further comprises a motor, the motor is connected to the first clamping portion through the connecting shaft, and the control component further comprises a processor;
the processor is configured to send a rotation instruction to the motor when receiving the tracking movement instruction sent by the object tracking component through a wired network or a wireless network;
the motor is configured to rotate according to the rotation instruction and drive the first clamping portion through the connecting shaft for position adjustment to adjust the orientation of the camera of the photographing device.

6. The photographing device stabilizer according to claim 1, wherein the photographing device stabilizer is a handheld stabilizer.

7. The photographing device stabilizer according to claim 1, wherein the object tracking component is configured to acquire the position information of the target object when a first posture feature is acquired according to the detection information, and send the tracking movement instruction to the control component through the network connection according to the position information.

8. The photographing device stabilizer according to claim 1, wherein the object tracking component is configured to stop acquiring the detection information of the oriented position when a second posture feature is acquired according to the detection information.

9. The photographing device stabilizer according to claim 1, wherein the object tracking component is connected to a direction adjustment mechanism, the control component is capable of controlling an orientation of a probe of the object tracking component through the direction adjustment mechanism, so that the object tracking component is oriented in the same direction as the camera.

10. The photographing device stabilizer according to claim 9, wherein the object tracking component comprises a front object tracking component and a rear object tracking component, when the control component receives a start-up information of a rear camera sent by the photographing device, the control component sends a start instruction to the rear object tracking component, the rear object tracking component is started, and the rear camera in a shooting state and the rear object tracking component in an object tracking state both face a rear of the photographing device and both face the same direction.

11. The photographing device stabilizer according to claim 9, wherein when the control component receives a start-up information of a rear camera sent by the photographing device, the probe of the object tracking component is enabled to face a rear of the photographing device by controlling the direction adjustment mechanism.

12. A photographing device stabilizer, comprising: a clamping component, an object tracking component, and a control component;
wherein the object tracking component is fixedly connected to a photographing device through the clamping component, a distance between the object tracking component and a camera of the photographing device is less than or equal to a preset distance threshold, and the object tracking component is oriented in the same direction as the camera;
a network connection is established between the control component and the object tracking component;
wherein the object tracking component is configured to acquire a detection information of an oriented position thereof, and when a position information of a target object is acquired according to the detection information, to send a tracking movement instruction to the control component through the network connection according to the position information;
and wherein the control component is configured to perform position adjustment control according to the position information when receiving the tracking movement instruction, so that the camera of the photographing device is oriented towards the target object;
wherein the clamping component further comprises a motor provided with a third clamping portion, one end of the motor clamps the photographing device through the third clamping portion, and the other end of the motor is fixedly connected to the control component;
the object tracking component is provided on the motor to be fixedly connected to the photographing device.

13. The photographing device stabilizer according to claim 12, wherein the object tracking component is connected to a direction adjustment mechanism, the control component is capable of controlling an orientation of a probe of the object tracking component through the direction adjustment mechanism, so that the object tracking component is oriented in the same direction as the camera.

14. The photographing device stabilizer according to claim 13, wherein the object tracking component comprises a front object tracking component and a rear object tracking component, when the control component receives a start-up information of a rear camera sent by the photographing device, the control component sends a start instruction to the rear object tracking component, the rear object tracking component is started, and the rear camera in a shooting state and the rear object tracking component in an object tracking state both face a rear of the photographing device and both face the same direction.

15. The photographing device stabilizer according to claim 13, wherein when the control component receives a start-up information of a rear camera sent by the photographing device, the probe of the object tracking component is enabled to face a rear of the photographing device by controlling the direction adjustment mechanism.

* * * * *